US007328262B2

(12) United States Patent
McDonagh et al.

(10) Patent No.: US 7,328,262 B2
(45) Date of Patent: Feb. 5, 2008

(54) TELECOMMUNICATIONS NETWORK SUBSCRIBER EXPERIENCE MEASUREMENT

(75) Inventors: Brendan McDonagh, Dublin (IE); Augustine Collins, County Kildare (IE); Philip William Beck, Dublin (IE); Thomas Morrisroe, County Wicklow (IE)

(73) Assignee: Aran Communications Limited, County Dublin (IE)

( * ) Notice: Subject to any disclaimer, the term of this patent is extended or adjusted under 35 U.S.C. 154(b) by 402 days.

(21) Appl. No.: 10/980,248

(22) Filed: Nov. 4, 2004

(65) Prior Publication Data

US 2005/0097209 A1 May 5, 2005

Related U.S. Application Data

(63) Continuation of application No. PCT/IE03/00066, filed on May 8, 2003.

(30) Foreign Application Priority Data

May 8, 2002 (IE) .................................. 2002/0367
Aug. 13, 2002 (IE) .................................. 2002/0674
Oct. 4, 2002 (IE) .................................. 2002/0798

(51) Int. Cl.
*G06F 15/173* (2006.01)
(52) U.S. Cl. ..................... 709/224; 455/423; 455/67.11
(58) Field of Classification Search ................ 455/423, 455/67.11, 425, 307, 226.1; 709/224; 375/350
See application file for complete search history.

(56) References Cited

U.S. PATENT DOCUMENTS 5,884,175 A * 3/1999 Schiefer et al. ............ 455/436
5,898,668 A * 4/1999 Shaffer ...................... 370/230
5,913,161 A 6/1999 Ozulkulu et al. ........... 455/405
6,119,000 A * 9/2000 Stephenson et al. ....... 455/432.1
6,721,560 B1 * 4/2004 Laiho ....................... 455/432.1
6,732,085 B1 * 5/2004 Mozes ........................... 707/2
6,832,085 B1 * 12/2004 McDonagh et al. ........ 455/423
2002/0072358 A1 * 6/2002 Schneider et al. .......... 455/423

FOREIGN PATENT DOCUMENTS

| DE | 10004847 | 8/2001 |
| EP | 0805608 | 11/1997 |
| WO | WO99/53703 | 10/1999 |
| WO | WO0056097 | 9/2000 |
| WO | WO02/49375 | 6/2002 |

OTHER PUBLICATIONS

Managing Quality of Service, Security, Roaming Scenarios . . . , Oct. 30, 2001, retrieved from Internet, XP002225044, pp. 1-15.

* cited by examiner

*Primary Examiner*—Lana Le
*Assistant Examiner*—April S. Guzman
(74) *Attorney, Agent, or Firm*—Jacobson Holman PLLC

(57) ABSTRACT

In a mobile network a packet interface (103) is monitored by a tap (160-163) in a non-intrusive manner. Captured transaction data is uploaded to a probe (155-158) linked to one or more taps. The probe acts as a slave to a server (159), activating and terminating data capture. A coordinator (601) of the probe (155) manages data capture and buffering according to the server. The server (150) filters the data according to a subscriber registry (203) and loads data until there are complete protocol descriptions. These provide real time subscriber-centered QoS metrics.

22 Claims, 6 Drawing Sheets

TELECOMMUNICATIONS NETWORK SUBSCRIBER EXPERIENCE MEASUREMENT

This is a continuation of PCT/IE03/00066 filed May 8, 2003 and published in English.

INTRODUCTION

1. Field of the Invention

The invention relates to customer experience measurement in mobile networks.

2. Prior Art Discussion

Many current mobile communication systems offer a wide range of services, including traditional voice telephony, streaming video, email, messaging, and file transfer. The consumption of these services by the user places different demands on the capacity of the system. The user's experience of the system thus varies with the type of service being requested.

As an example, the end-user requires the system and its services to be highly accessible. The system may not be accessible due to the user being out of coverage, or due to network equipment being non-operating at some moment in time. Perhaps the cell is barred, or there is no access to an internal node such as the SGSN in the case of GPRS or UMTS. If the system is operating at close to capacity in that area, the user may be denied admission for the requested service. In another example, the end-user experience is affected by system delays. These may include the delay in setting up a connection to the network, the delay in establishing the use of a service, or the arrival delay of data relating to the service to the mobile station. In a further example, the end-user experience is affected by the retainability of the services. These may include a voice or data call being dropped rather than surviving until the end-user terminates it. A call or connection may persist, but the data service which is delivered over that connection may no longer be in operation.

Other examples of end-user QoS experience include variations in delay causing jitter and thus malfunction of streaming data services, and reductions in data rate due to congestion in the mobile system.

Currently, network operators have limited knowledge of QoS as experienced by the end-user. This is especially so in emerging mobile networks offering advanced data services, as it is difficult to monitor OoS from measurements taken in the network infrastructure alone. One approach to monitoring QoS is so-called drive-testing, in which a specially equipped mobile station is brought to a predetermined location in the network, measures air interface parameters at that location, and uploads them to an analysis system at a later stage. A limitation of such an approach is that it collects information about the air interface at a specific location only, and information only about a pre-determined service usage.

It is also know to analyse some user-specific criteria to assess adherence to service level agreements (SLAs). Such SLAs are sometimes part of the FCAPS (Fault, Configuration, Accounting, Performance, and Security) procedure devised by the Telemanagement Forum ("TMF"). This is performed by offline analysis of call detail records ("CDRs") generated by some network elements for billing purposes. While this approach does provide some user-specific data it is of a limited extent and is effectively historical.

The invention is therefore directed towards providing for improved customer-centric quality-of-service measurement.

SUMMARY OF THE INVENTION

According to the invention, there is provided a management system for a telecommunication network, the management system comprising:
- a plurality of taps for monitoring in real time activity at network interfaces to provide network transaction data,
- a filter for filtering the transaction data on a subscriber identifier basis to provide per-user quality-of-service metrics in real time, and
- a server for aggregating the metrics and for storing at least some of the metrics and transaction data.

By tapping activity at interfaces and filtering on a subscriber basis the invention provides comprehensive subscriber-centric quality-of-service data.

In one embodiment, the taps each capture network messages and generate a transaction event record for one or more messages, the transaction records being provided as the transaction data.

In another embodiment, at least some of the taps are non-invasive.

In a further embodiment, at least one tap is connected to monitor traffic at a network interface between network elements handling messages for multiple subscribers.

In one embodiment, at least one tap is a software agent executing on a subscriber device.

In another embodiment, the software agent executes on a SIM card of a subscriber mobile device or in the device's circuit.

In a further embodiment, there are a plurality of probes located remotely from the server and connected to at least one tap.

In one embodiment, each probe comprises a task coordinator, and a registry storing data concerning taps presently linked to the probe and characteristics of the network interfaces where the taps are located.

In another embodiment, the registry holds data concerning mobile terminal configurations.

In a further embodiment, the task coordinator manages commands from the server defining monitoring tasks including start times and end times.

In one embodiment, the task coordinator comprises a function for receiving filtering commands from the server for filtering in the probes.

In another embodiment, the probe buffers transaction data for periodic upload to the server.

In a further embodiment, the server polls the probes for transaction data uploads.

In one embodiment, the server comprises a collection process associated with each tap or each probe, at least some collection processes performing format conversion or decryption on data received from an associated probe.

In another embodiment, the server comprises a subscriber registry for storing identifiers of subscribers for whom quality-of-service metrics are to be determined and for transferring identifiers to the filter, located either in the server or in a probe.

In a further embodiment, the server comprises a data loading function for loading filtered data into memory.

In one embodiment, the data loading function performs transaction data.

In another embodiment, the server comprises a filtering memory structure for incomplete records and the data loading function writes filtered data to said memory structure, and monitors the data to determine when a complete protocol procedure description for a subscriber has been loaded, and transfers the complete descriptors as metrics to a complete records memory structure.

In a further embodiment, the server comprises a report generating function for analysing the metrics and generating reports according to operator configurations.

In one embodiment, the server comprises an alarm generating function for analysing the metrics and generating alarms according to operator configurations.

In another embodiment, the configurations comprise service level agreements.

In a further embodiment, the server comprises a publish-and-subscribe mechanism to allow remote mechanisms to receive alarm notifications.

In one embodiment, the thresholds are set by Key Performance Indicators.

In another embodiment, the metrics include:
attach success rate,
time to complete an Attach procedure,
detach success rate,
time to complete Detach procedure,
abnormal termination rate and cause,
PDP Context Activation success rate,
time to complete PDP Context Activation procedure,
PDP Context De-activation success rate,
time to complete PDP Context De-activation procedure,
PDP Context Abnormal De-activation rate & cause, or
PDP Context Throughput in uplink & downlink.

In a further embodiment, the metrics include:
service activation success rate,
service completion success rate,
service average bitrate,
service startup and shutdown latencies,
how often the actual bitrate is within x % of maximum bitrate,
how often SDUs are delivered out of order,
number of SDUs lost or detected as erroneous,
residual bit error rates in SDU's subflows,
how often the transfer delay of SDUs is within x % of the maximum allowed, or
how often the actual bitrate is within x % of guaranteed bitrate.

In one embodiment, the metrics are classified in one or more of:
a conversation class of telephony speech, VoIP, audio conferencing, or VPN,
a streaming class of one-way video streams (e.g. sports highlights, music videos, security camera feeds), or one-way audio streams (e.g. music or sound broadcasts),
an interactive class of database retrieval, client/server interactions, browsing and Internet access, WAP access, process control, remote sensing, remote control, or file transfer, and
a background class: non-urgent measurement collection, email, or SMS/MMS.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
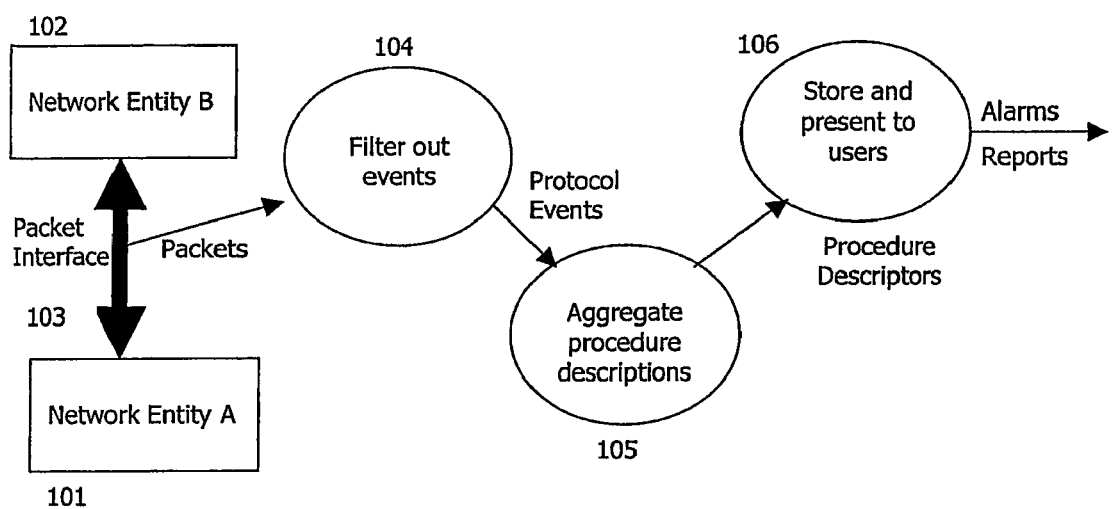
FIG. 1 is a flow diagram of the data flows within a mobile telecommunications network management system of the present invention.

Referring to FIG. 1, a network entity A 101 is interfaced to a network entity B 102 by means of a network packet interface 103. This interface 103 carries packet traffic including packets containing data about the behaviour of a high level protocol such as GPRS. In the example of GPRS and UMTS, the interfaces are identified in the relevant 3GPP and ETSI standards as the Gb (GPRS) or Iu (UTRAN), Gn, and Gi interfaces. The packets are captured by taps at the interfaces and are processed in a step 104 by probes. This filtering eliminates packets which do not carry the required information about the protocol events or services.

A protocol such as GPRS or UMTS contains protocol events relating to procedures such as, for example, attaching to the network, detaching from the network, and activating and de-activating a PDP context. Similarly, service information which is useful in determining the QoS being experienced by the user includes URLs being visited, the behaviour of email using POP3, FTP behaviour, video and audio streaming, and X 0.25 or IP data services. The next step, 105 involves using a subscriber id to retain only those protocol events and service usage data relating to such specified subscribers. In the case of GPRS and UMTS, the subscriber id known as IMSI is used to discriminate subscribers. This step also involves aggregating together protocol events which contribute to a more complete protocol procedure so as to produce a single procedure descriptor for each procedure executed by each subscriber. For example, in the case of GPRS, activating a PDP context involves several protocol events, such as PDP context activate request, PDP context activation accept, and PDP context activation complete.

By the time filtering 104 and aggregation 105 are complete, a set of discrete protocol procedure descriptors have been produced from a series of packets on the interface. These descriptors provide metrics including Key Performance Indicators which have been defined on the protocol. Such KPIs can include for example latencies, delays, success rates, and throughput values. These descriptors are stored and processed by a server in step 106, and from them alarms may be raised and reports may be produced.

A server connected to the probes carries out the steps 105 and 106. The activity of step 104 is carried out by a probe connected to the network tap.

Figure 2:
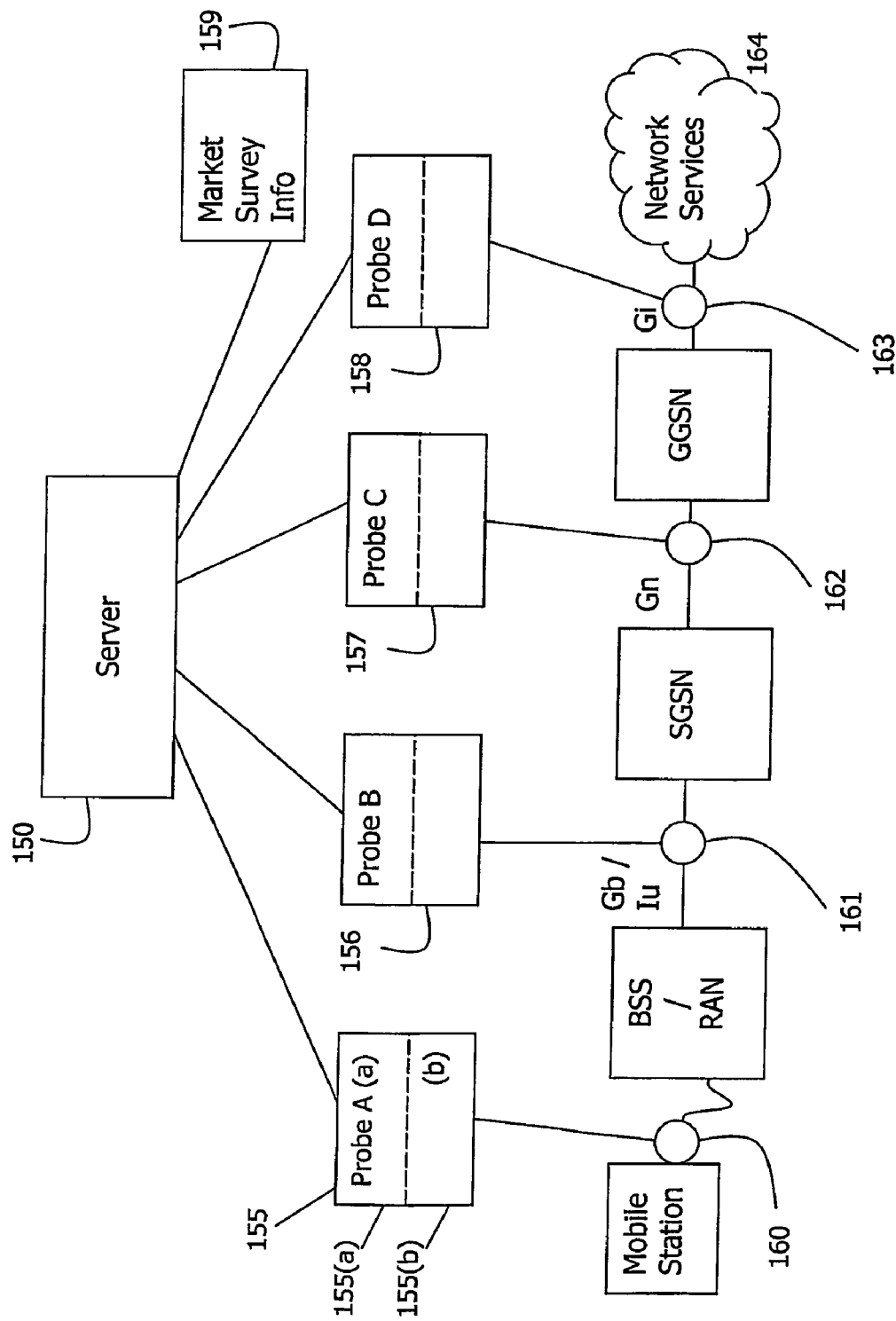
FIG. 2 is a block diagram illustrating architecture of the management system.

Referring to FIG. 2 a management system to implement the steps 104-106 comprises:

a server 150;
probes 155-158; and
network interface taps 160-163.

The network comprises a mobile station 160, a BSS 171, an SGSN 172, a GGSN 173, and network services 174. Probe B 156 is connected to the tap 161 attached to the Gb interface (GRPS) or Iu interface (UMTS), and provides the following protocol procedures and data fields:

ATTACH: IMSI, cell-id, timestamp, procedure duration, result

DETACH: IMSI, cell-id, timestamp, procedure duration, result

PDP CONTEXT ACTIVATION: IMSI, cell-id, timestamp, procedure duration, result, origin, data address, QoS Negotiated, QoS Requested PDP CONTEXT DEACTIVATION: IMSI, cell-id, timestamp, procedure duration, result, origin, number of bytes sent & received.

The management system monitors activity at the various interfaces to gather transaction data and to filter this data to provide subscriber-centric QoS metrics in real time. The taps 161-163 are non-invasive insofar as they do not impose an overhead on network elements or affect traffic across the interfaces. The tap 160 is an agent executing on the mobile station, and may thus impose a minimal overhead. Because some of the filtering operations are provided by the distributed probes, they can be very quickly performed in a dynamic real time manner. The filtered data delivered to the server 150 can be used and stored in a variety of ways as desired by the network operator. The probes 155-158 temporarily store the filtered transaction data in memory files which are frequently uploaded by collection processes in the server 150. This frequency may be as high or low as required by the operator. The server had functions for various activities including alarm detection for real time or near real time generation of alarm events on a subscriber-centric basis.

The link between the probes 155-158 and the taps 160-163 is very specific to the nature of the interface concerned and the construction of the taps and probes. For example, the links are different for E12 Mb/s GPRS and LAN 100 Mb/s network interfaces. Also, even for one type of network interface such as E12 Mb/s, the different taps may handle data differently. However, the links between the probes 155-158 and the server are uniform, there being one interface protocol for each network interface. The low-level interfacing functions are below the interrupted lines within the probes 155-158.

Figure 3:
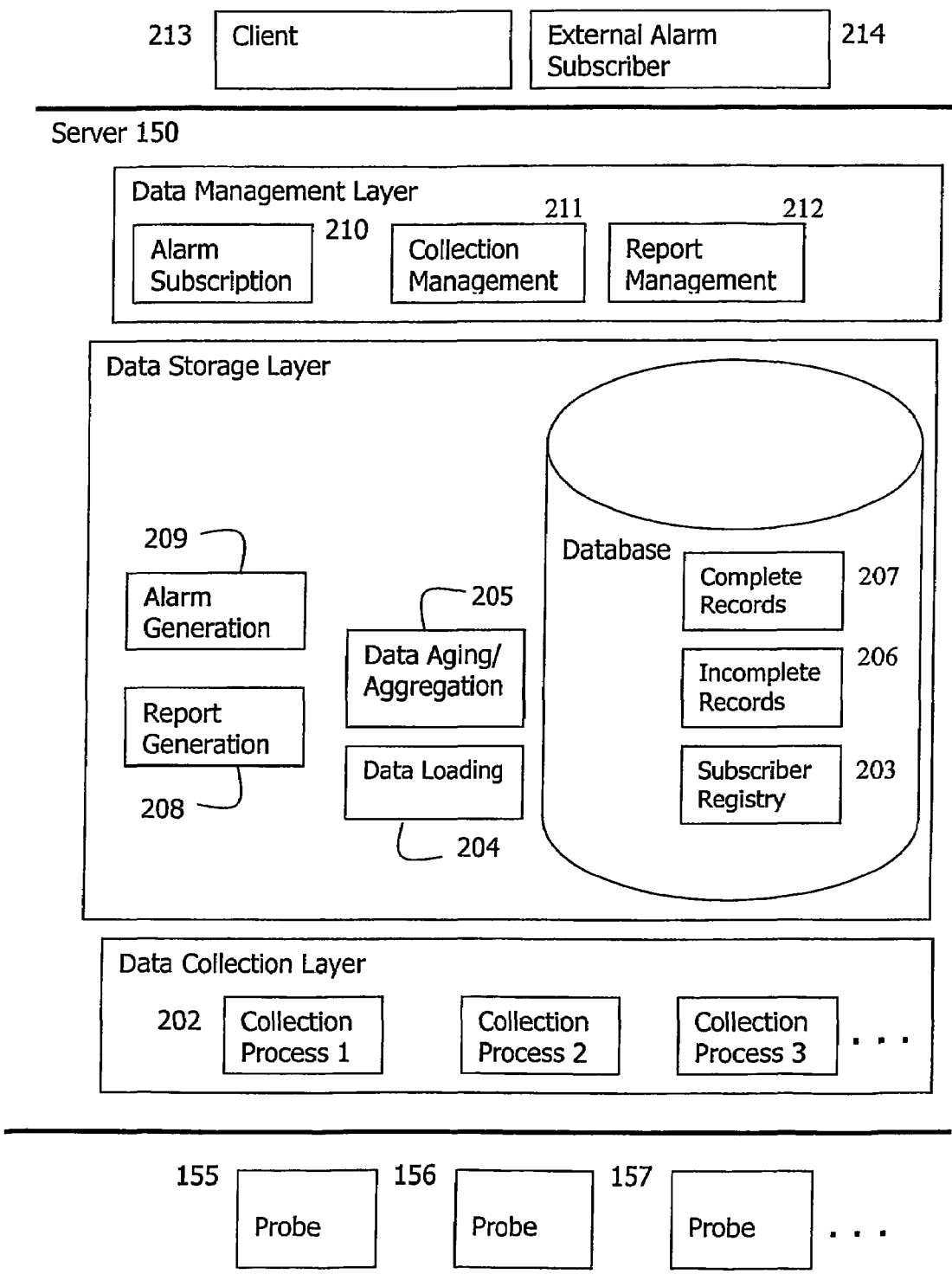
FIG. 3 depicts internal functional components of a server of the management system.

Referring to FIG. 3, this depicts the internal functional components of the server 150. The interface between the probes 155-158 and the server 150 has certain characteristics. An unambiguous definition of the subscriber-related data (and other data as appropriate) which is provided by the probes 155-158 is required. This data may be produced periodically or in real-time (or near real-time). This data is transferred in a defined manner to the server 150. The server 150 has the ability to control and manage the production of data by the probes 155-158. All of these characteristics follow a proprietary scheme, or alternatively may be based on an existing standard such as for example the 3GPP Performance Management Integration Reference Point, as described in the document 3GPP TS 32.401 "Performance Management, Concepts & Requirements".

A collection process 202 in the server 150 fetches the data periodically from an associated probe once it is produced. This involves acquiring the data from a probe 155-158, for example by means of FTP, and as necessary decrypting and deciphering the format of the incoming data. Different collection processes 202 cater for different types of probe and their interfaces. Multiple data sources are supported, dependent on time synchronisation and correlation requirements.

Once the data has been fetched by the server 150, it is filtered by subscriber identifier. A subscriber registry 203 contains the subscriber ids (for example IMSI) which are of interest to the operator. There is a subsystem which manages the contents of the subscriber registry 203 and allows properly authorised users to inspect, alter, add, and delete subscriber ids in the subscriber registry 203. Filtering occurs in the server as part of data loading by a function 204. In another embodiment, a set of subscriber ids may be sent to the probe in order to configure it to carry out the filtering in a distributed manner.

The data loading function 204 extracts the fields of interest from each protocol event which is allowed through the filter, and stores these in an incomplete records table 206. As each protocol event which goes to make up a procedure arrives, the fields of interest are extracted and stored. At a certain point, different for each procedure, all the fields of interest for the procedure are obtained, and a completed protocol procedure descriptor is stored in a complete records table 207. An example of the fields of interest from the incoming protocol events for the GPRS procedure PDP Context Activation includes fields for the timestamp of the PDP Context Activation Request, and the timestamp for the PDP Context Activation Complete. From this, the data loading function 204 can fill in the duration field in the procedure descriptor in the complete records table 207 for the PDP Context Activation procedure. As an example of a possible KPI based on this data, the operator may be interested in the mean time to set up a PDP Context for all premium users. This example can be extended to provide KPIs dealing with other important aspects of service offered to groups of users, such as attach latencies, throughput, error rates, service denial rates, abnormal termination rates, and comparisons between QoS levels requested.

A report generation function 208 generates reports per subscriber, per cell, or per service (or per APN if appropriate). These reports may refer to different periods of time, such as daily, weekly, or monthly. The reports capture the user experience of either individual users or user groups. Users may be ranked on criteria such as throughput or perceived quality. Violations of QoS thresholds specified in KPIs which form part of SLAs are included in reports. The reports are defined and set up in a report management function 212 and are made available to a client system 213.

An alarm generation function 209 generates alarms when KPI values breach predefined thresholds. This may be used to monitor adherence to Service Level Agreements (SLAs). These alarms are made available outside the server 150 by means of a publish-subscribe mechanism—consumers of the alarms subscribe via the alarm subscription subsystem 210. Those skilled in the art will recognise that alarms may, for example, be made available by means of the 3GPP standard Corba IRP for alarms, by means of a customised interface, by email, text, or TCP/IP socket. Alarms may be delivered to the user by means of the client system 213 or to an external alarm subscriber 214. Remote client systems may received alarms and notifications on the basis of a publish-and-subscribe mechanism of the server.

A collection management function 211 is responsible for managing the data collection and storage. It sets up the parameters for collecting the data, and associates a particular collection process 202 with a probe 155-158. It sets up the parameters for a data ageing and aggregation function 205, including the time period for which raw data is held before it is aggregated or summarised for longer-term storage.

Figure 4:
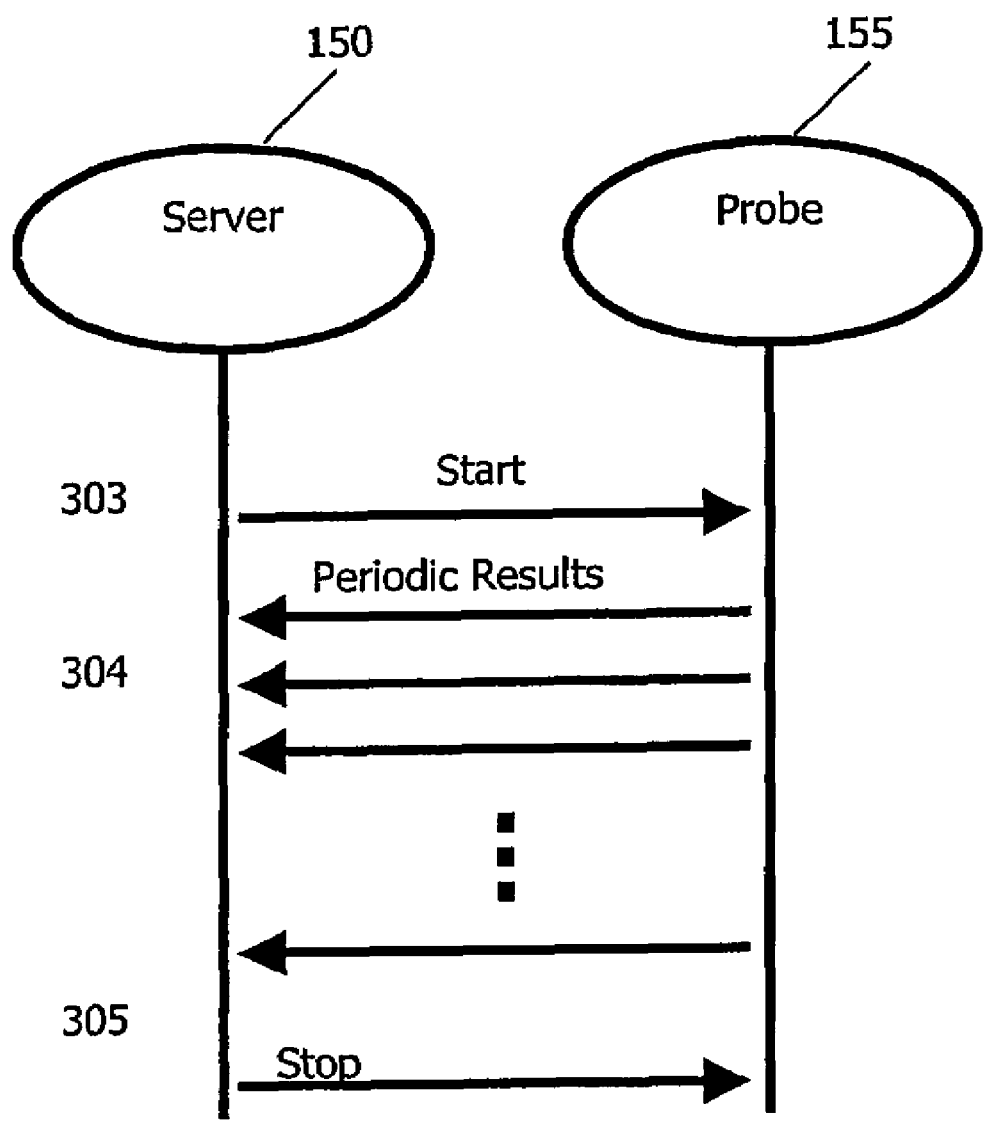
FIG. 4 depicts message flow between entities of the management system.

Referring to FIG. 4, a typical sequence of messages exchanged between the server 150 and the probe 155 is shown. When the server 150 requires a packet monitoring task to be started, a start message 303 is sent to the probe 155. This message includes a command to start monitoring, as well as other configuration information which may include a unique monitoring task id, a description of which packet events are to be collected, and a granularity period defining how often data items are to be packaged and sent to the server 150. When the probe 155 receives this message, it carries out initialisation activities in preparation for sending periodic results 304 to the server 150.

At some time after a granularity period has completed, the data items for that period are packaged and sent to the server 150 in a periodic results message 304 by the probe 155. This is repeated for each granularity period. The periodic results are received by the server 150, and stored and processed as described above. The periodic results message 304 may contain addressing information defining the sender and receiver of the message, the unique monitoring task id, the data items, and appropriate status information.

At some future point, the server 150 sends a stop 305 message to the probe 155. This causes the probe 155 to carry out various termination activities which leave the probe 155 in an appropriate state for further monitoring tasks to be started at some later stage.

The system has built-in safeguards to deal with unexpected situations. As an example, if a new start message 303 is received by the probe 155 before the currently executing monitoring task is stopped by means of a stop 305, the probe will make its best effort to satisfy the requirements of both tasks for the period during which they are both executing. In a further example, if the start 303 message requests specific data to be collected which the probe is not capable of collecting, for example because the specific data is not available on the interface, then this will be notified to the management system 301 by means of the status information in the periodic results, or by some other appropriate means.

In a further example, the operator may be concerned about security issues, and may require a correct response to an authorisation challenge from the probe 157 to the server 150 to ensure that subscriber usage pattern information is only sent to authorised consumers. This could be implemented for example by including a password in the start message, or by an additional protocol step to challenge the server 150. Further security could be applied by requiring the periodic results to be sent over a well-established secure connection methodology such as, for example, IPSEC or SSL.

Referring again to FIG. 2, examples of Key Performance Indicators based on the captured information from the probe 156 could include:

Attach Success Rate: (number of ATTACHes where ATTACH result code=successful)/(total number of ATTACHes.)

Abnormal Termination Rate: (number of PDP CONTEXT DEACTIVATIONs where result code < > OK)/(total number of PDP CONTEXT DEACTIVATIONs).

Average PDP context throughput in uplink: (PDP CONTEXT DEACTIVATION number of bytes sent)/(PDP CONTEXT DEACTIVATION timestamp-PDP CONTEXT ACTIVATION timestamp).

Protocol latency leading to delay before useful data begins to flow: PDP CONTEXT ACTIVATION procedure duration.

In another example of the application of the invention to GPRS and UMTS, probe C 157 is attached to the Gn interface. This interface carries unciphered data packets to and from the network services. Probe C 157 is capable of examining these packets on the fly and producing data about the services being consumed by users. Examples of key performance indicators available by probing this interface include (and are not limited to):

Service activation success rate
Service completion success rate
Service throughput
Service usage profiles
Service SLA parameter adherence
Service startup latency
Service shutdown latency In another example, probe A 155 monitors at the mobile terminal user-visible QoS metrics such as service latencies and service success rates. Probe A 155 may in one embodiment execute on the mobile station, for example in the SIM card, or may be a separate entity in communication with the mobile terminal.

In another example, the probe C 157 also monitors Gn traffic between GSNs (including those interconnected via a GRX equipment) which provides metrics on roaming and mobility management topics.

In another example, the probe D 157 monitors the Gi reference point which may be comprised of several types of interfaces, including IP and X 0.25, and probe D 158 provides metrics on these interfaces including interface usage profiles and interface latencies.

In another example, market survey information 159 may be loaded into the server 150. In a typical mobile operator, the marketing function interviews selected user groups to determine what their subjective experience of the network is. The present invention allows user experience to be measured from the equipment in a well-defined and objective manner. It is of major benefit to the operator to be in a position to compare the user experience as measured by the equipment and as collected by the market surveys. It is imperative that the market surveys are designed carefully and the set of measurements and the calculations performed on them are chosen carefully, so that comparable measurements are being made. As an example, a weighted average of a set of equipment measurements may be calculated to reflect the subjective importance of different measurements when assessing the user's experience of the network. The results of this weighted average may be compared with the survey results by means of an accepted statistical technique (for example, a bar chart showing the two sets of results side by side).

Figure 5:
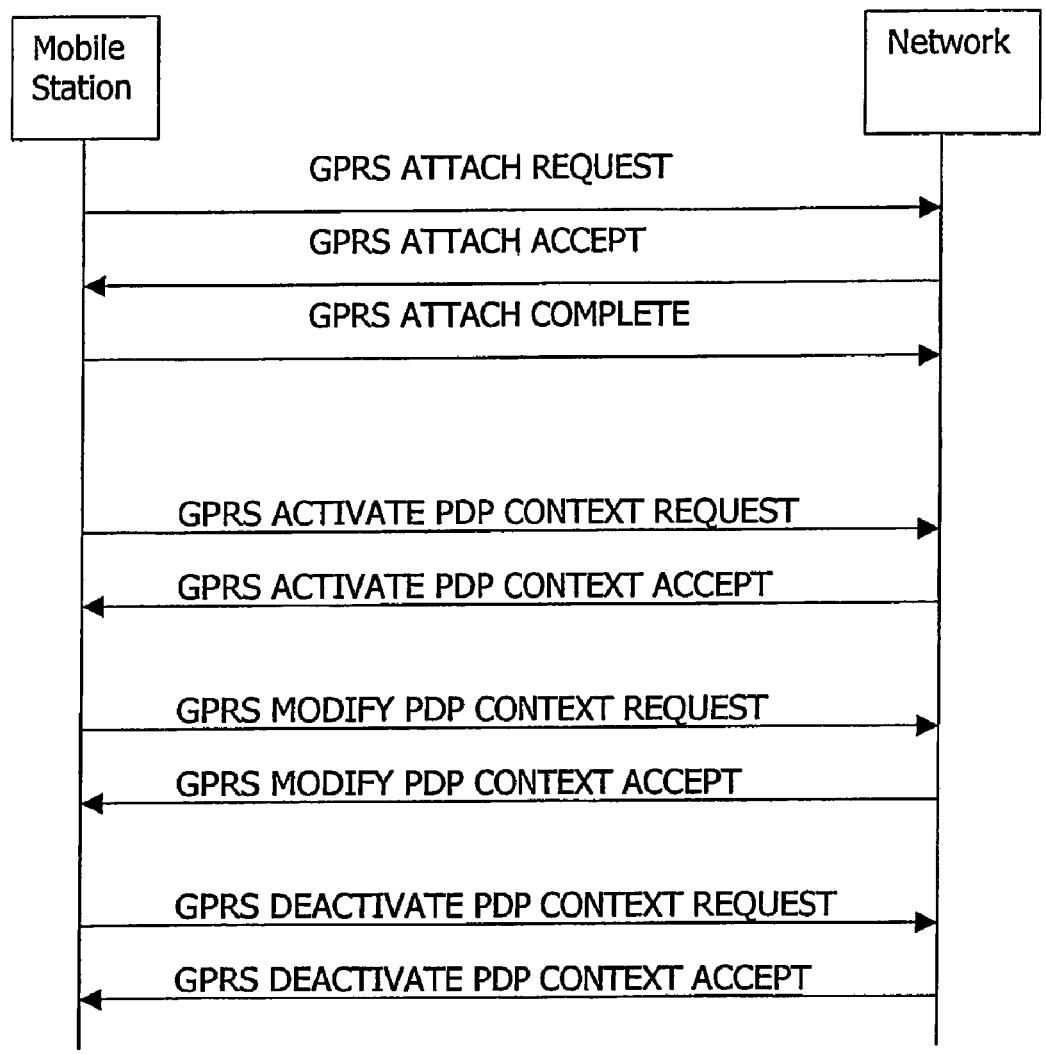
FIG. 5 depicts an example of protocol events being sent from a mobile station to the network, such events being examples of traffic monitored in real time by the management system.

FIG. 5 shows an illustrative example of protocol events being sent between a mobile station and a network. These events are monitored by the tap 160, which generates one transaction event per operation. For example, the first three messages GPRS ATTACH REQUEST, GPRS ATTACH ACCEPT, AND GPRS ATTACH COMPLETE are configured to complete one transaction event. One event is uploaded by the tap 160 to the probe 155. The transaction events are filtered by the probe 155 to provide per-user events, as configured by the server 150.

Figure 6:
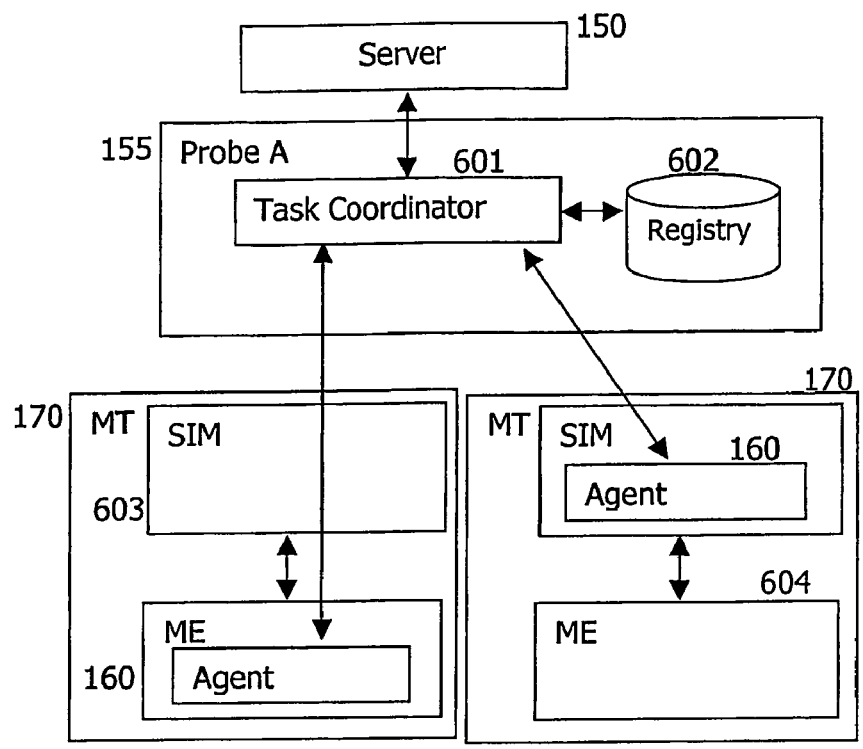
FIG. 6 depicts internal functional components of the management system which manage agents running on mobile terminals and produce data for the management system.

Turning to FIG. 6, operation of the system to monitor aspects of mobile terminal behaviour which give further insight into the subscriber's experience of the mobile system as illustrated. This figure depicts the internal functional components of the probe 155 and an agent 160 for monitoring mobile terminal behaviour in accordance with the present invention. In this scenario the item 160, while referred to generally as a "tap" in the context of the items 160-163 is more correctly referred to as a software agent. This is because it executes on a mobile device 170 SIM on its circuit processor or in its SIM card. On the other hand the items 161-163 are taps at network interfaces. Where the agent executes on the device's circuit itself, it may be downloaded as an applet.

The probe A 155 comprises a task coordinator 601 and a registry 602. The registry 602 holds details of which mobile terminals have an agent 160 installed on them, and any configuration or variant information required about each agent. The registry 602 also holds profiles defining which data counters are available on mobile terminal types, as these vary greatly from model to model and between mobile terminal software installation levels. Each mobile terminal has a unique identifier in the context of the registry, which is used to distinguish commands to the mobile terminal and data returning from it.

The task coordinator 601 receives a request from the server 150 which defines a monitoring task on one or a plurality of mobile terminals 170. This request also specifies which data and events are to be collected as this monitoring task proceeds. A start-time and end-time may also be specified in the request. Appropriate commands are sent from the task co-ordinator 601 to the agent 160 to cause monitoring to commence or stop as required.

As data is produced periodically by each mobile terminal 170, it is transmitted via the available data transfer mechanisms of the intervening mobile network to the task co-ordinator 601. The task coordinator 601 processes these periodic data transmissions, aggregating data from a plurality of mobile terminals, and mediating the data into a consistent format and presentation. It is important to avoid overloading the network with data transmissions—hence, mechanisms will be in place to reduce or avoid traffic during busy periods, and to smooth out peaks in traffic, and to compress data before transmission.

This data is then made available to the server 150 in a similar manner to the other probe types illustrated in FIG. 2, and the server 150 stores, processes, analyses, and visualises the data in a manner which is useful to the network operator in assessing the end-user's experience of the network's QoS.

FIG. 6 also depicts the internal architecture at the mobile terminal 170. The agent 160 may either be pre-installed before the mobile terminal 170 is sent to the field, or is installed over-the-air by an industry-standard method.

The monitoring task description received by the agent 160 from the task co-ordinator 601 includes a description of the data to be collected and the granularity of the collection. The agent 160 interacts with the SIM card 603 and/or the mobile equipment 604 to collect this information as required. The data available depends on the mobile equipment type and the features which are supported by the software variant on the mobile equipment. This is defined, as stated above, in the profile of the mobile terminal type in the registry 602. As an example, the agent will report configuration and status information. For example, the agent may run an AT command to retrieve the actual manufacturer model, revision, and serial number of the mobile equipment—this information may be used to cross-check that the correct profile in the registry 602 is being used. In another example, the agent 160 may read the current battery level, which will affect whether the monitoring task can successfully execute throughout its defined activity period without the battery running out.

Figure 7:
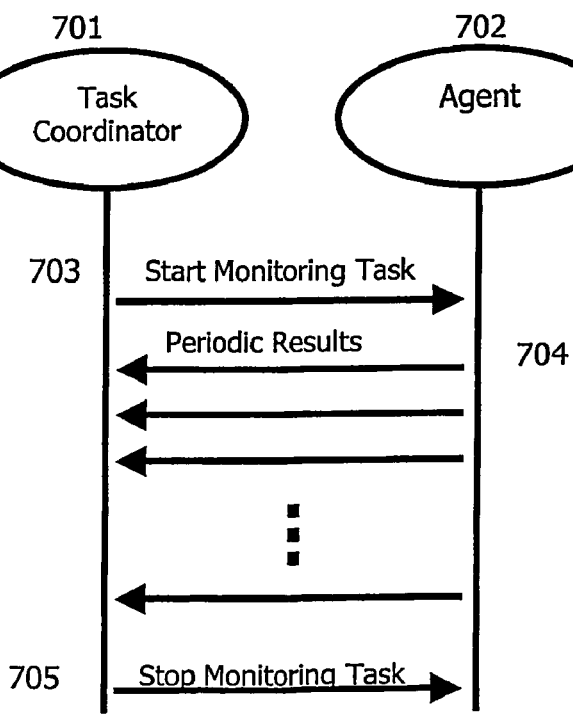
FIG. 7 shows an example of task coordination messages and data being exchanged between a task coordinator and agents running on mobile terminals.

Turning to FIG. 7, a typical sequence of messages exchanged between the task coordinator 601 and the agent 160 running on the mobile terminal 170 is shown. When the task coordinator 601 requires a monitoring task to be started, a Start Monitoring Task message 703 is sent to agent on the appropriate mobile terminal. This message includes addressing information defining the sender and receiver of the message, a command to start monitoring, a unique monitoring task id, a description of which data items are to be collected, and a granularity period defining how often data items are to be packaged and sent to the task coordinator 601. When the agent 606 receives this message, it carries out various initialisation activities in preparation for sending periodic results 404 to the task coordinator 601.

At some time after a granularity period has completed, the data items for that period are packaged and sent to the task coordinator 601 in a Periodic Results message 704 by the agent 606. This is repeated for each granularity period. The periodic results are received by the task coordinator 601, stored, processed, analysed and visualised as previously described. A Periodic Results message 704 contains addressing information defining the sender and receiver of the message, the unique monitoring task id, the data items, and appropriate status information.

When the finish time of the monitoring task has passed, the task coordinator 601 sends a Stop Monitoring Task 705 message to the agent 160. This causes the agent 160 to carry out various termination activities which leave the agent 166 and the mobile terminal 170 in an appropriate state for further monitoring tasks to be started.

The invention has built-in safeguards to deal with unexpected situations. As an example, if a new Start Monitoring Task message 703 is received by the agent 160 before the currently executing monitoring task is stopped by means of a Stop Monitoring Task 705, the agent will make its best effort to satisfy the requirements of both tasks for the period during which they are both executing. In a further example, if the Start Monitoring Task 703 message requests specific data to be collected which the agent is not capable of collecting, for example because there is no programmed interface on the mobile terminal in question to support the retrieval of the specific data, then this will be notified to the server 150 means of the status information in the Periodic Results, or by some other appropriate means.

In a further example, the subscriber may be concerned about security issues, and unauthorised access to the subscriber's SIM card and information about the subscriber's usage of the network. A password may be placed in the registry 602 and also in the agent 160 at the moment it is installed in the SIM. When the task coordinator 601 sends the Start Monitoring Task 703 message, it can optionally include the password retrieved from the registry for this subscriber. The agent 160 will then compare the password in the message with the password it has stored within itself, and allow the monitoring task to proceed only if there is a match.

Those skilled in the art will recognise that the mechanisms for transmitting data through the network and over the air to the agent 606 and for retrieving SIM data could use SMS messages. Further possibilities include sending data messages via a PDP context or some other connection-oriented or connection-less data transfer mechanism. The invention specifies the process of monitoring the end-user's experience of service quality, independent of the mechanism used for communicating the monitored information across the network.

Some example use cases and scenarios describing how the network operator may benefit from the invention are as follows.

(a) An operator offers Gold Service to all users belonging to a single corporate customer (for example bank). The operator wishes to implement a Service Level Management capability which monitors the service level supplied to all Gold Class users, comparing the service level against the level specified in the Service Level Agreement for such users, and taking appropriate action if the level is not sufficient.

(b) An operator wishes to provide proactive Customer Care. The management system detects poor or deteriorating user experience of the network, possibly before the users themselves realise it. An alarm is generated which is subscribed to by the Customer Care system which has the opportunity to deal with it before the user reports the situation. This might involve contacting the user with an assurance that improvements are being made, or with some recompense, for example.

(c) An operator wishes to carry out service impact estimation. By inspecting the previous effect on user experience when a new service is introduced, estimates can be produced about the effect of introducing a new service to the customer base.

(d) An operator wishes to check whether a particular user equipment type delivers good QoS or not. This may involve for example correlating service usage patterns with handset type, or correlating QoS issue occurrence with handset type. This may be of particular interest to an operator in monitoring the performance of new handset types when they are launched.

(e) A super-operator wishes to check that a roaming user gets the same QoS in each network belonging to the super-operator.

(f) An operator traces QoS as user roams in-call between cells. The operator wishes to monitor how roaming users use the network, and proactively react to problems experienced by this class of user. The operator may wish to focus on QoS improvements in order to retain this class of floating customer, as they may generate high revenues.

(g) An operator checks whether the services most consumed by a Gold Class user are those listed in the user's service definition.

(h) An operator compares bad user experience as detected by the management system (e.g. in a certain cell accessing certain services, or while roaming) with KPI breaches obtained from NMS/EM.

The overall intent of these examples is to show what the benefits to the operator of the management system would be. These include understanding the connection between service usage and quality, understanding what type of site produces the most revenue, proactively managing the response to SLA violations by means of for example automatic discounting, ensuring the successful launch of a new service, understanding what effect poor performance has on customer usage of a service, detecting negative or poor customer experience, optimising the customer experience, and correlating network statistics with customer experience.

It will be appreciated that the management system converts protocol events into network-based QoS metrics which will cater for large networks and are available in near real-time. It also converts service usage data into user-based QoS metrics which will cater for large numbers of users and are available in near real-time. The management system also converts service usage data into network-based QoS metrics which will cater for large networks and are available in near real-time. The management system also allows the definition of Key Performance Indicators (KPIs) with associated thresholds which are based on end-user experience of the network. This allows the operator to support and manage the definition of Service Level Agreements (SLAs) related to the end-user's experience of the network.

In the case of WAP access via GPRS, relevant measures include per user statistics, correlations between page traffic and page performance, throughputs, page size, pages visited, download times, page availability, errors, data transfer efficiency (payload/total packet size), and abandoned, failed, and successful hits. In the case of Internet access via GPRS, relevant measures include per user statistics, correlations between page traffic and page performance, throughputs, page size, pages visited, download times, page availability, errors, data transfer efficiency (payload/total packet size), and abandoned, failed, and successful hits. In the case of VPN via GPRS, relevant measures include per APN statistics, GTP tunnel creation success rates, abandoned, failed, and successful VPN element setups and terminations. In the case of MMS via GPRS, relevant measures include breakup between WAP and SMTP delivery, per-APN statistics, time to delivery, average/actual message size, request/delivery success rates, throughputs, payload types.

The invention is not limited to the embodiments described but may be varied in construction and detail. For example, the management system may be used by a land-line telecommunication network operator. Also, the data may be pushed by the probes to the server, rather than being transmitted in response to a polling signal.

The invention claimed is:

1. A management system for a telecommunication network, the management system comprising:
    a plurality of taps for monitoring in real time activity at network entity interfaces to provide network transaction data,
    a filter for filtering the transaction data on a subscriber identifier basis to provide per-user quality-of-service metrics in real time,
    a server for aggregating the metrics and for storing at least some of the metrics and transaction data;
    wherein the taps each capture network messages and generate a transaction event record for one or more messages, the transaction records being provided as the transaction data,
    wherein there are a plurality of probes located remotely from the server and each is connected to at least one tap,
    wherein each probe comprises a task coordinator, and a registry storing data concerning taps presently linked to the probe and characteristics of the network interfaces where the taps are located,
    wherein the task coordinator manages commands from the server defining monitoring tasks including start times and end times, and
    the task coordinator comprises a function for receiving filtering commands from the server for filtering in the probes.

2. The management system as claimed in claim 1, wherein at least some of the taps are non-invasive.

3. The management system as claimed in claim 1, wherein at least one tap is connected to monitor traffic at a network interface between network elements handling messages for multiple subscribers.

4. The management system as claimed in claim 1, wherein at least one tap is a software agent executing on a subscriber device.

5. The management system as claimed in claim 4, wherein the software agent executes on a SIM card of a subscriber mobile device or in the device's circuit.

6. The management system as claimed in claim 1, wherein the registry holds data concerning mobile terminal configurations.

7. The management system as claimed in claim 1, wherein the probe buffers transaction data for periodic upload to the server.

8. The management system as claimed in claim 7, wherein the server polls the probes for transaction data uploads.

9. The management system as claimed in claim 1, wherein the server comprises a collection process associated with each tap or each probe, at least some collection processes performing format conversion or decryption on data received from an associated probe.

10. The management system as claimed in claim 1, wherein the server comprises a subscriber registry for storing identifiers of subscribers for whom quality-of-service metrics are to be determined and for transferring identifiers to the filter, located either in the server or in a probe.

11. The management system as claimed in claim 1, wherein the server comprises a data loading function for loading filtered data into memory.

12. The management system as claimed in claim 11, wherein the data loading function performs transaction data processing.

13. The management system as claimed in claim 11, wherein the server comprises a filtering memory structure for incomplete records and the data loading function writes filtered data to said memory structure, and monitors the data to determine when a complete protocol procedure description for a subscriber has been loaded, and transfers the complete descriptors as metrics to a complete records memory structure.

14. The management system as claimed in claim 1, wherein the server comprises a report generating function for analysing the metrics and generating reports according to operator configurations.

15. The management system as claimed in claim 1, wherein the server comprises an alarm generating function for analysing the metrics and generating alarms according to operator configurations.

16. The management system as claimed in claim 15, wherein the configurations comprise service level agreements.

17. The management system as claimed in claim 14, wherein the server comprises a publish-and-subscribe mechanism to allow remote mechanisms to receive alarm notifications.

18. The management system as claimed in claim 14, wherein thresholds are set in the report by Key Performance Indicators.

19. The system as claimed in claim 1, wherein the metrics include:
attach success rate,
time to complete an Attach procedure,
detach success rate,
time to complete Detach procedure,
abnormal termination rate and cause,
PDP Context Activation success rate,
time to complete PDP Context Activation procedure,
PDP Context De-activation success rate,
time to complete PDP Context De-activation procedure,
PDP Context Abnormal De-activation rate & cause, or
PDP Context Throughput in uplink & downlink.

20. The system as claimed in claim 1, wherein the metrics include:
service activation success rate,
service completion success rate,
service average bitrate,
service startup and shutdown latencies,
how often the actual bitrate is within x % of maximum bitrate,
how often SDUs are delivered out of order,
number of SDUs lost or detected as erroneous,
residual bit error rates in SDU's subflows,
how often the transfer delay of SDUs is within X % of the maximum allowed, or
how often the actual bitrate is within x % of guaranteed bitrate.

21. The system as claimed in claim 1, wherein the metrics are classified in one or more of:
a conversation class of telephony speech, VoIP, audio conferencing, or VPN,
a streaming class of one-way video streams (e.g. sports highlights, music videos, security camera feeds), or one-way audio streams (e.g. music or sound broadcasts),
an interactive class of database retrieval, client/server interactions, browsing and Internet access, WAP access, process control, remote sensing, remote control, or file transfer, and
a background class: non-urgent measurement collection, email, or SMS/MMS.

22. A management system for a telecommunication network, the management system comprising:
a plurality of taps for monitoring in real time activity at network entity interfaces to provide network transaction data,
a filter for filtering the transaction data on a subscriber identifier basis to provide per-user quality-of-service metrics in real time,
a server for aggregating the metrics and for storing at least some of the metrics and transaction data;
wherein the taps each capture network messages and generate a transaction event record for one or more messages, the transaction records being provided as the transaction data,
wherein there are a plurality of probes located remotely from the server and each is connected to at least one tap,
wherein each probe comprises a task coordinator, and a registry storing data concerning taps presently linked to the probe and characteristics of the network interfaces where the taps are located,
wherein the task coordinator manages commands from the server defining monitoring tasks including start times and end times, and
the task coordinator comprises a function for receiving filtering commands from the server for filtering in the probes;
wherein the probe buffers transaction data for periodic upload to the server;
wherein the server comprises a collection process associated with each tap or each probe, at least some collection processes performing format conversion or decryption on data received from an associated probe;
wherein the server comprises a data loading function for loading filtered data into memory; and
wherein the data loading function performs transaction data processing.

* * * * *